US011334581B2

(12) United States Patent
Azaria et al.

(10) Patent No.: US 11,334,581 B2
(45) Date of Patent: May 17, 2022

(54) SYSTEM AND METHOD FOR PROVIDING AN ENRICHED SENSORY RESPONSE TO ANALYTICS QUERIES

(71) Applicant: Sisense Ltd., Tel Aviv (IL)

(72) Inventors: Adi Azaria, Tel Aviv (IL); Amir Orad, Tel Aviv (IL); Guy Levy Yurista, Rockville, MD (US); Guy Boyangu, Tel Aviv (IL); Eldad Farkash, Tel Aviv (IL); Ophir Marko, Netanya (IL)

(73) Assignee: Sisense Ltd., Tel Aviv (IL)

( * ) Notice: Subject to any disclaimer, the term of this patent is extended or adjusted under 35 U.S.C. 154(b) by 545 days.

(21) Appl. No.: 15/377,016

(22) Filed: Dec. 13, 2016

(65) Prior Publication Data
US 2018/0011930 A1 Jan. 11, 2018

Related U.S. Application Data
(60) Provisional application No. 62/360,428, filed on Jul. 10, 2016.

(51) Int. Cl.
G06F 16/2458 (2019.01)
(52) U.S. Cl.
CPC .................. G06F 16/2465 (2019.01)
(58) Field of Classification Search
CPC ................................. G06F 16/2465
See application file for complete search history.

(56) References Cited

U.S. PATENT DOCUMENTS

| 5,991,765 | A | 11/1999 | Vethe | |
|---|---|---|---|---|
| 6,349,290 | B1* | 2/2002 | Horowitz | G06Q 20/108 705/35 |
| 8,494,507 | B1* | 7/2013 | Tedesco | G09B 21/009 455/418 |
| 8,615,404 | B2 | 12/2013 | Karkanias et al. | |
| 2008/0147515 | A1* | 6/2008 | Abraham | G06Q 30/0603 235/383 |
| 2010/0153453 | A1* | 6/2010 | Knowles | G06Q 10/107 707/784 |
| 2013/0060603 | A1* | 3/2013 | Wagner | G06Q 30/0202 705/7.29 |
| 2013/0311881 | A1* | 11/2013 | Birnbaum | G06F 3/016 715/702 |
| 2014/0019533 | A1* | 1/2014 | Sherman | G06Q 50/01 709/204 |

* cited by examiner

Primary Examiner — Van H Oberly
(74) Attorney, Agent, or Firm — M&B IP Analysts, LLC

(57) ABSTRACT

A system and method for providing sensory analytics responses. The method comprises collecting raw data from a plurality of data sources; extracting, from the collected raw data, a subset of the raw data to be analyzed; generating, based on the extracted subset of the raw data, an analytics dataset, wherein the analytics dataset includes a performance indicator; determining, based on at least one received input, at least one query; determining, based on the generated analytics dataset, a response to the at least one query, wherein the response includes at least one sensory output; and causing projection of the determined at least one sensory output.

13 Claims, 4 Drawing Sheets

SYSTEM AND METHOD FOR PROVIDING AN ENRICHED SENSORY RESPONSE TO ANALYTICS QUERIES

CROSS-REFERENCE TO RELATED APPLICATIONS

This application claims the benefit of U.S. Provisional Application No. 62/360,428 filed on Jul. 10, 2016, the contents of which are hereby incorporated by reference.

TECHNICAL FIELD

The present disclosure relates generally to analytics, and more particularly to improving user experiences by providing enriched sensory responses to requests for analytics.

BACKGROUND

Data analytics systems are becoming an increasingly important part of a growing number of industries as the amount of raw data produced or otherwise retained in those industries increases. Many companies utilize analytics in an effort to obtain meaningful insights into the nature and consequences of raw data. Data analytics systems assist in determining these insights by processing the raw data and automatically providing output indicating information that may be readily interpreted by end users. The overwhelming amount of data to be analyzed in such industries often results in challenges in deriving meaningful analytics and, therefore, insights.

A particular set of techniques and tools utilized for data analytics may be employed by business intelligence (BI) systems. Such BI systems acquire and transform raw data (e.g., structured, unstructured, semi-structured data, or a combination thereof) into information that is meaningful and useful for analyzing a business. Insights generated by BI systems may be utilized for decision-making purposes related to, e.g., operations (e.g., product positioning or pricing), strategy (e.g., priorities or goals), and the like. Such decision-making use may be further enhanced by incorporating information from external systems (e.g., external systems providing data related to the industry) with internal data of the company.

In addition to challenges in deriving insights, existing solutions face challenges in conveying analytics information such as insights to end users. In particular, some existing analytics solutions typically lack features causing end-users to fully engage in evaluating analytics outputs. The resulting lack of engagement may result in overlooking or otherwise not properly considering otherwise significant insights.

It would therefore be advantageous to provide a solution that would overcome the deficiencies of the prior art.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

Certain embodiments disclosed herein include a method for providing sensory analytics responses. The method comprises collecting raw data from a plurality of data sources; extracting, from the collected raw data, a subset of the raw data to be analyzed; generating, based on the extracted subset of the raw data, an analytics dataset, wherein the analytics dataset includes a performance indicator; determining, based on at least one received input, at least one query; determining, based on the generated analytics dataset, a response to the at least one query, wherein the response includes at least one sensory output; and causing projection of the determined at least one sensory output.

Certain embodiments disclosed herein also include a system for providing sensory analytics responses. The system includes a processing circuitry; and a memory, the memory containing instructions that, when executed by the processing circuitry, configure the system to: collect raw data from a plurality of data sources; extract, from the collected raw data, a subset of the raw data to been analyzed; generate, based on the extracted subset of the raw data, an analytics dataset, wherein the analytics dataset includes a performance indicator; determine, based on at least one received input, at least one query; determine, based on the analytics dataset, a response to the at least one query, wherein the response includes at least one sensory output; and cause projection of the determined at least one sensory output.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
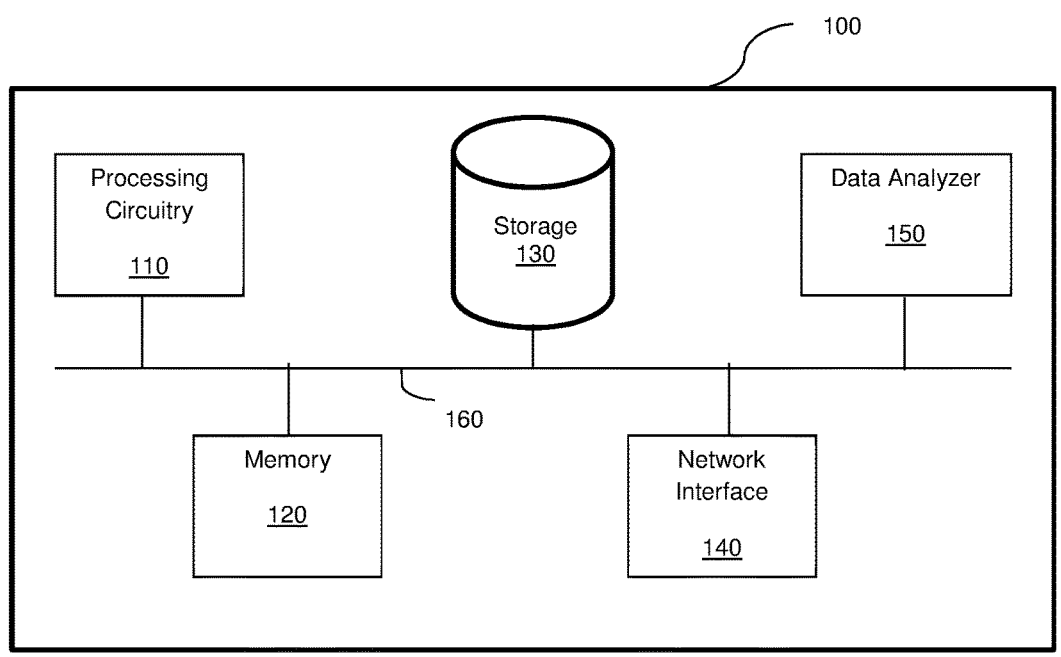
FIG. 1 is a schematic diagram of an analytics generator according to an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for providing sensory-based responses to queries for analytics. In an embodiment, an analytics generator (e.g., a business intelligence system) and a sensory controller are utilized to provide the sensory-based responses. In a further embodiment, the sensory controller is connected to at least one sensory input and at least one sensory output.

In an embodiment, an analytics dataset is generated based on data collected or received from a plurality of data sources. The data source may include, but are not limited to, databases, customer relationship management (CRM) systems, enterprise resource planning (ERP) systems, computerized system validation (CSV) systems, combinations thereof, and the like. At least one query for analytics is received. The at least one query may be received as sensory inputs via the sensory controller. A response to the query is determined based on the at least one query and the analytics dataset. At least one sensory output for conveying the response is determined, and the response is provided by causing the at least one sensory output.

FIG. 1 shows an example schematic diagram of an analytics generator 100 according to an embodiment. In an embodiment, the analytics generator 100 may be utilized as a business intelligence (BI) system. The analytics generator 100 includes a processing circuitry 110, a memory 120, a storage 130, a network interface 140, and a data analyzer 150. In an embodiment, the components of the analytics generator 100 may be communicatively connected via a bus 105.

The processing circuitry 110 may be realized as one or more hardware logic components and circuits. For example, and without limitation, illustrative types of hardware logic components that can be used include field programmable gate arrays (FPGAs), application-specific integrated circuits (ASICs), system-on-a-chip systems (SOCs), general-purpose microprocessors, microcontrollers, digital signal processors (DSPs), and the like, or any other hardware logic components that can perform calculations or other manipulations of information.

The memory 120 may be volatile (e.g., RAM, etc.), non-volatile (e.g., ROM, flash memory, etc.), or a combination thereof. In one configuration, computer readable instructions to implement one or more embodiments disclosed herein may be stored in the storage 130.

In another embodiment, the memory 120 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry 410 to perform the various processes described herein. Specifically, the instructions, when executed, cause the processing circuitry 110 to provide sensory-based analytics, as discussed herein below.

The storage 130 may be magnetic storage, optical storage, and the like, and may be realized, for example, as flash memory or other memory technology, CD-ROM, Digital Versatile Disks (DVDs), or any other medium which can be used to store the desired information. In an embodiment, the storage 130 stores analytics datasets generated by the data analyzer 150.

The network interface 140 allows the analytics generator 100 to communicate with data sources, with sensory control modules, or both, for the purposes of, for example, obtaining raw data, receiving queries for analytics, causing sensory-based analytics to be provided to a user device, and the like.

The data analyzer 150 is configured to analyze raw data from data sources and to generate, based on the raw data, analytics. The data analyzer may be further configured to extract a subset of raw data, and to analyze only the subset of raw data to generate the analytics. The analytics may be generated in response to a query for analytics or upon satisfaction of one or more rules (e.g., at predetermined time intervals, when a threshold of data collection has been crossed, etc.). The data analyzer 150 may be further configured to generate, based on the analytics, a report, a graphical user interface, both, and the like. The analysis of the raw data may include, but is not limited to, data mining, process mining, statistical analyses, predictive analyses, predictive modeling, process modeling, data lineage, complex event processing, and prescriptive analytics. The analytics may be stored as datasets including information such as, but not limited to, key performance indicators, key quality indicators, statistical analyses, and the like. The operation of the data analyzer 150 is discussed in greater detail below.

It should be understood that the embodiments described herein are not limited to the specific architecture illustrated in FIG. 1, and other architectures may be equally used without departing from the scope of the disclosed embodiments.

Figure 2:
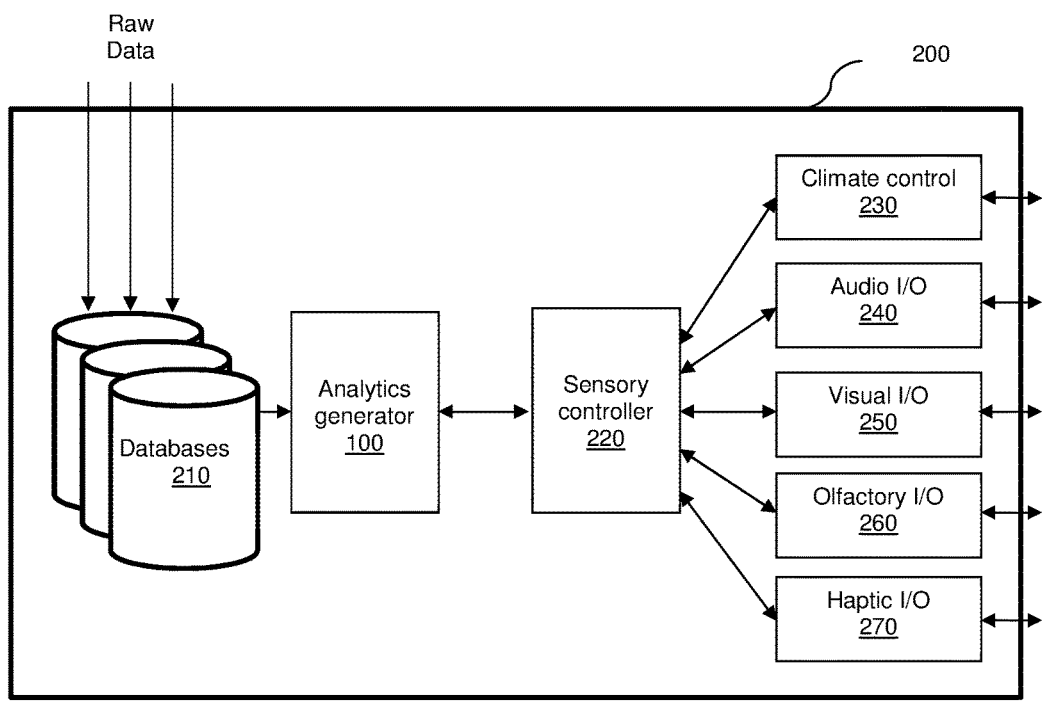
FIG. 2 is a schematic diagram of a sensory-based analytics system according to an embodiment.

FIG. 2 is an example schematic diagram of a sensory-based analytics system 200 according to an embodiment. In an embodiment, the sensory-based analytics system 200 is communicatively connected with a sensory controller. The system 200 include one or more databases 210, the analytics generator 100, a sensory controller 220, a climate control interface 230, an audio input/output (I/O) interface 240, a visual I/O interface 250, an olfactory I/O interface 260, and a haptic interface I/O 270.

The database 210 stores raw data obtained from a plurality of data sources (not shown). The data sources may include, but are not limited to, web sources, operational systems, or other sources of data to be analyzed. Such data may include structured, unstructured, or semi-structured data, or a combination thereof. As a non-limiting example, the data sources may include data such as, but not limited to, metadata of an electronic document (e.g., filename, author, size), product data, account data, patient data, student data, planning data, combinations thereof, and the like. In a further embodiment, the database 210 may also store analytics generated by the analytics generator 100.

In an embodiment, the analytics generator 100 is configured to generate analytics based on the raw data in the database 210. The analytics generator 100 may be further configured to store the generated analytics in the database 210.

In an embodiment, the analytics generator 100 is communicatively connected to the sensory controller 220. The sensory controller 220 is communicatively connected to one or more sensory control interfaces. In the example embodiment shown in FIG. 2, the sensory control interfaces communicatively connected to the sensory controller include the climate control interface 230, the audio input/output (I/O) interface 240, the visual I/O interface 250, the olfactory I/O interface 260, and the haptic interface I/O 270. Each of the example sensory control interfaces may be include or be communicatively connected to one or more sensors. It should be noted that the example sensory control interfaces shown in FIG. 2 are not limiting, and that more or fewer sensory control interfaces may be utilized, and that types of interfaces other than the example interfaces shown in FIG. 2 may be utilized, without departing from the scope of the disclosure.

The climate control interface 230 is configured to control one or more environmental control devices or systems such as, but not limited to, an air conditioning unit; a heating, ventilation, and air conditioning (HVAC) unit; a combination thereof; and the like. The climate control interface 230 further include or be communicatively connected to environmental sensors such as, but not limited to, a thermal sensor, a humidity sensor, and the like.

The audio I/O interface 240 may include, but is not limited to, a microphone, a speaker, or both. The audio I/O interface may be utilized to receive signals related to sounds in an area, to cause projection of sounds, or both. The audio I/O interface 240 or the sensory controller 220 may include a speech-to-text (S2T) adapter for converting, e.g., voice commands from a user into textual data. The S2T adapter may further include a natural language processing module. In an example implementation, the controller 220 may detect a plurality of users based on, e.g., different voice signatures received via the microphone. In some embodiments, the sensory controller 220 may be realized a processing circuitry, examples of which are provided above.

The visual I/O interface 250 may include sensors such as, but is not limited to, a camera, a depth-sensing camera (e.g., a time-of-flight camera), a light sensor, and the like. The visual I/O interface 250 may also include or be communicatively connected to a display, a projector, a programmable lightbulb (e.g., a smart LED lightbulb), a window shade control, a combination thereof, and the like. The visual I/O interface 250 may be utilized to receive signals related to, e.g., objects and organisms in an area, to project visual content, or both. In an example implementation, the visual I/O interface 250 may detect, via the sensors, a plurality of users.

The olfactory I/O interface 260 may include, but is not limited to, an olfactometer, an electronic nose, an odor releasing unit, a combination thereof, and the like. The olfactory I/O interface 260 may be utilized to receive signals related to scents in an area, to provide a fragrance, or both.

The haptic I/O interface 270 may include, but is not limited to, a tactile electronic display, a haptic feedback vibrator, an air vortex ring, an ultrasonic emitter, a force feedback unit, a pressure sensor, a combination thereof, and the like. The haptic I/O interface 270 may be utilized to receive signals related to force, vibration and the like, as well as to cause movement, vibration, or application of force.

The sensory controller 220 is configured to receive signals from the I/O interfaces. In an embodiment, the analytics generator 100 or the sensory controller 220 may be configured to assign a priority to each user detected by any of the interfaces 230 through 270 (e.g., when a plurality of users is detected by the audio I/O interface 240 or the visual I/O interface 250). The priorities may be assigned, e.g., randomly, based on strengths of received signals corresponding to particular users, and the like.

In another embodiment, the sensory controller 220 may be configured to determine, based on the received signals, whether any of the detected users are recognized. A user may be recognized if, for example, the signal corresponding to the user matches a recognized signal above a predetermined threshold. Each recognized signal is a signal associated with a particular user (e.g., an audio signal of the user's voice or a visual signal of the user) and may be stored in, e.g., the database 210 or a local storage (not shown) of the sensory controller 220. In another embodiment, priorities of users that are not recognized are lower than priorities of users that are recognized.

In an embodiment, queries received by users may be handled according to an order determined based on the respective priorities of the users. The queries may be for, e.g., analytics, reports, and the like.

In another embodiment, the analytics generator 100 may be further configured to determine, based on the received signals, at least one query and a response to the at least one query. The response to the queries may include, but is not limited to, analytics, reports, graphical user interfaces, sensory outputs, combinations thereof, and the like.

In a further embodiment, the response may further include sensory outputs. The sensory outputs may include, but are not limited to, visual outputs, audio outputs, olfactory outputs, haptic outputs, climate changes, and the like. In yet a further embodiment, the sensory outputs may be determined based on the generated analytics. In a further embodiment, determining the sensory outputs may be further based on one or more predetermined thresholds. Some examples for generated responses are provided below.

As a non-limiting example, if a revenue analytic is above a predetermined threshold, the sensory outputs may be determined to include a visual output including a green display of the revenue analytic and an audio output including the statement: "Revenue is good: $500,000 this period." As another non-limiting example, if a profit analytic indicates that a company suffered a net loss, the sensory outputs may be determined to include a red display of the profit analytic and lowering of a room temperature. In yet a further embodiment, the predetermined thresholds utilized for determining the sensory outputs may depend on the user. For example, thresholds for a user of a first company may be different from thresholds from a user of a second, larger company.

It should be further noted that the types of sensors described herein are merely examples and do not limit the various disclosed embodiments. Other sensors such as, but not limited to, barometers, radiation sensors, proximity sensors, and the like, may be equally utilized without departing from the scope of the disclosed embodiments.

It should be further noted that the components of the sensory-based analytics system 200 are shown in a single unit merely for simplicity purposes and may be distributed via a network without departing from the scope of the disclosed embodiments. In particular, in an example deployment, any of the interfaces 230 through 270 may be communicatively connected to the sensory-based analytics system via a network. In a further example, any of the interfaces 230 through 270 may be external to and geographically distant from the sensory-based analytics system 200. An example deployment of an I/O interface communicatively connected to the sensory-based analytics system 200 over a network is seen in FIG. 3.

Figure 3:
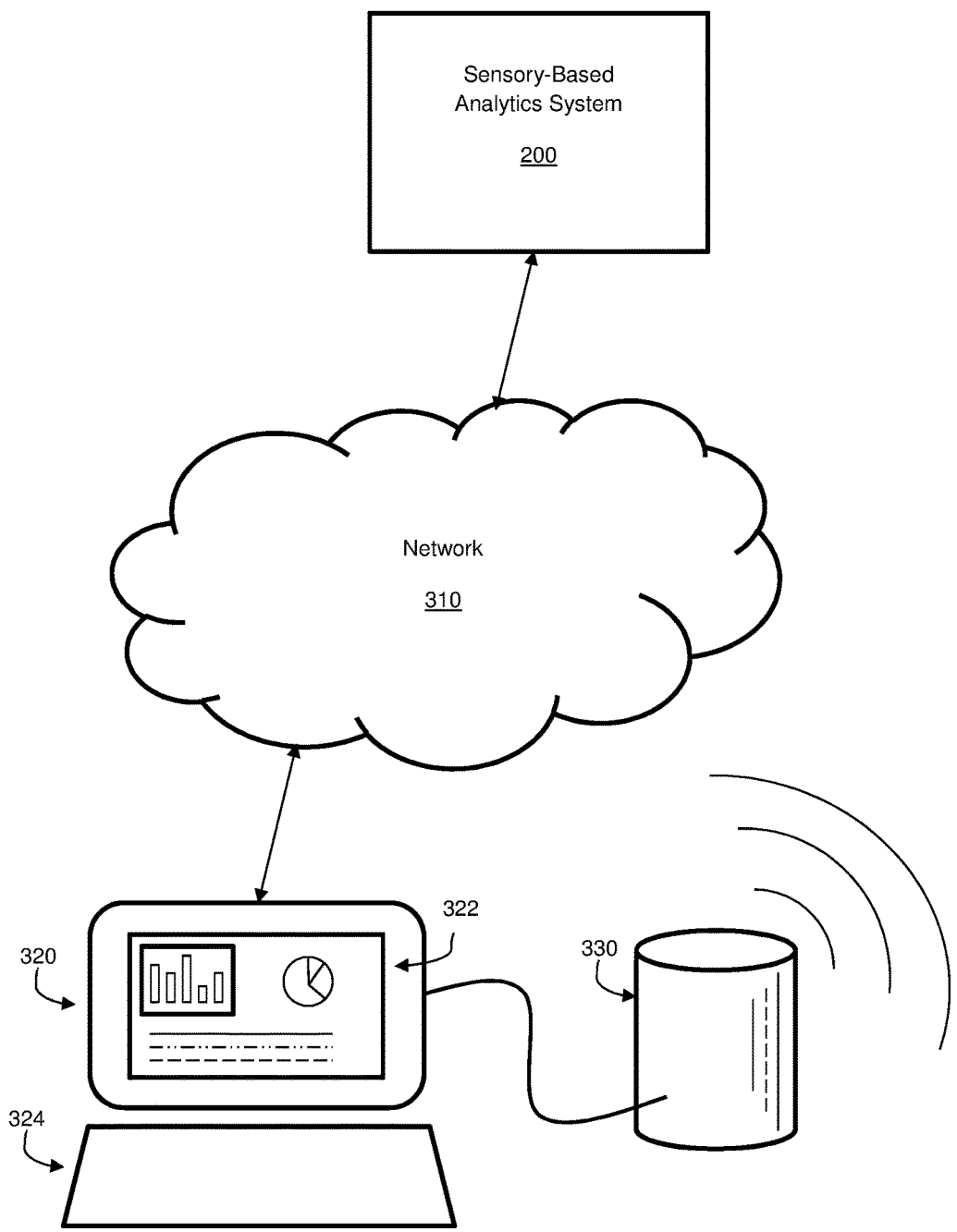
FIG. 3 is a network diagram illustrating a deployment of a sensory-based analytics system according to an embodiment.

FIG. 3 is an example network diagram 300 illustrating a deployment of a sensory-based analytics system 200 according to an embodiment. In the example network diagram 300, the sensory-based analytics system 200 is communicatively connected to a user device 320 via a network 310. The network 310 may be, but is not limited to, a wireless, cellular or wired network, a local area network (LAN), a wide area network (WAN), a metro area network (MAN), the Internet, the worldwide web (WWW), similar networks, and any combination thereof. The user device 320 may be, but is not limited to, a personal computer, a laptop, a tablet computer, a smartphone, a wearable computing device, or any other device. The user device 320 may include, but is not limited to, a processing element, a memory, a storage device, inputs, outputs, and the like.

In the example network diagram 300, the user device 320 includes a display 322 and a keyboard 324, and the user device 320 is connected to an audio I/O device 330. The audio I/O device 330 may include, but is not limited to, a processing circuitry, a microphone, and a speaker (not shown). The user device 320 may be utilized to send a query to the sensory-based analytics system 200. The query may be, but is not limited to, a request for analytics, a report, or a graphical user interface (GUI) generated by the sensory-based analytics system 200. The graphical user interface may be, but is not limited to, a dashboard. In an embodiment, the sensory-based analytics system is configured to send the requested data for display on the display 322.

In an example deployment, the audio I/O device 330 detects sound made by a user of the user device 320 as audio signals received via the microphone. The audio signals may be processed by the audio I/O device 330, the sensory-based analytics system 200 and the like. The processing may include, but is not limited to, natural language processing for generating textual output based on the received audio signal. Alternatively or collectively, textual data may be received as inputs via the keyboard 324. In an embodiment, the sensory-based analytics system 200 is configured to parse the textual data to determine at least one query.

In another embodiment, the sensory-based analytics system 200 may be configured to receive one or more user inputs via, e.g., the keyboard 324, a mouse (not shown), a touch screen (not shown), or other I/O interfaces of the user device 320.

In a further embodiment, the sensory-based analytics system 200 is configured to determine a response based on the at least one query. The response may include, but is not limited to, environmental changes (e.g., raising or lowering temperature via an HVAC unit), a visual projection (e.g., of analytics, a report, a graphical user interface, etc.), an audio projection, olfactory feedback, haptic feedback, combinations thereof, and the like. In an embodiment, the sensory-based analytics system 200 is further configured to determine at least one sensory interface for providing the determined response to the user of the user device 320. The determination of the at least one sensory interface may be based on, but not limited to, the at least one query, the response, one or more predetermined rules, a combination thereof, and the like.

Utilization of sensory outputs in combination with displays of analytic values may be useful for improving human processing of analytic values. For example, a user may be more likely to notice that a value is below a target value if the value is accompanied by audio of the word "bad" more than if the value is simply displayed in normal text with no audio. Further, addition of sensory outputs may allow for faster human processing of values. For example, a user may more quickly recognize a "good" value if it is displayed as flashing and green than if the value is displayed in normal (i.e., not flashing) black and white text. Moreover, positive and negative user reactions based on sensory outputs may leave greater impressions on the users, increasing the likelihood of proper attention and remembering of analytics.

As a non-limiting example, a user of the user device 320 may say "How are our sales figures?" while physically proximate to the audio I/O device 330. The microphone captures audio signals of the user's statement. The audio I/O device 330 generates a textual output based on the captured audio signals. The user device 320 receives the textual output from the audio I/O device 330 and sends the textual output to the sensory-based analytics system 200 over the network 310.

The sensory-based analytics system 200 parses the textual output to determine a query for a sales figure as compared to a threshold value. Accordingly, the sensory-based analytics system 200 generates, based on data received from a sales department data source, an analytic indicating a total amount of sales in US dollars. In this example, the analytic is a numerical value of $45,690.83. It is determined that the analytic is above a predetermined threshold value of $30,000.00. The sensory-based analytics system 200 also determines the audio I/O interface 330 and the display 322 as interfaces for providing the response. Further, the sensory-based analytics system 200 determines sensory outputs including a green flashing display of the analytic and an audio output projecting: "Good." The sensory-based analytics system 200 sends the determined sensory outputs to the user device 320, thereby causing projection of the sensory outputs via the display 322 and the audio I/O interface 330.

As another non-limiting example, a user of the user device 320 may say "What are our sales figures?" while physically proximate to the audio I/O device 330. The microphone captures audio signals of the user's statement. The audio I/O device 330 generates a textual output based on the captured audio signals. The user device 320 receives the textual output from the audio I/O device 330 and sends the textual output to the sensory-based analytics system 200 over the network 310.

The sensory-based analytics system 200 parses the textual output to determine a query for a sales figure value. Accordingly, the sensory-based analytics system 200 generates, based on data received from a sales department data source, an analytic indicating a total amount of sales in US dollars. In this example, the analytic is a numerical value of $20,001.89. It is determined that the analytic is above a predetermined threshold value of $50,000.00. The sensory-based analytics system 200 also determines the audio I/O interface 330 and the display 322 as interfaces for providing the response. Further, the sensory-based analytics system 200 determines sensory outputs including a red flashing display of the analytic and an audio output projecting: "Sales for this period are $20,001.89." The sensory-based analytics system 200 sends the determined sensory outputs to the user device 320, thereby causing projection of the sensory outputs via the display 322 and the audio I/O interface 330.

Figure 4:
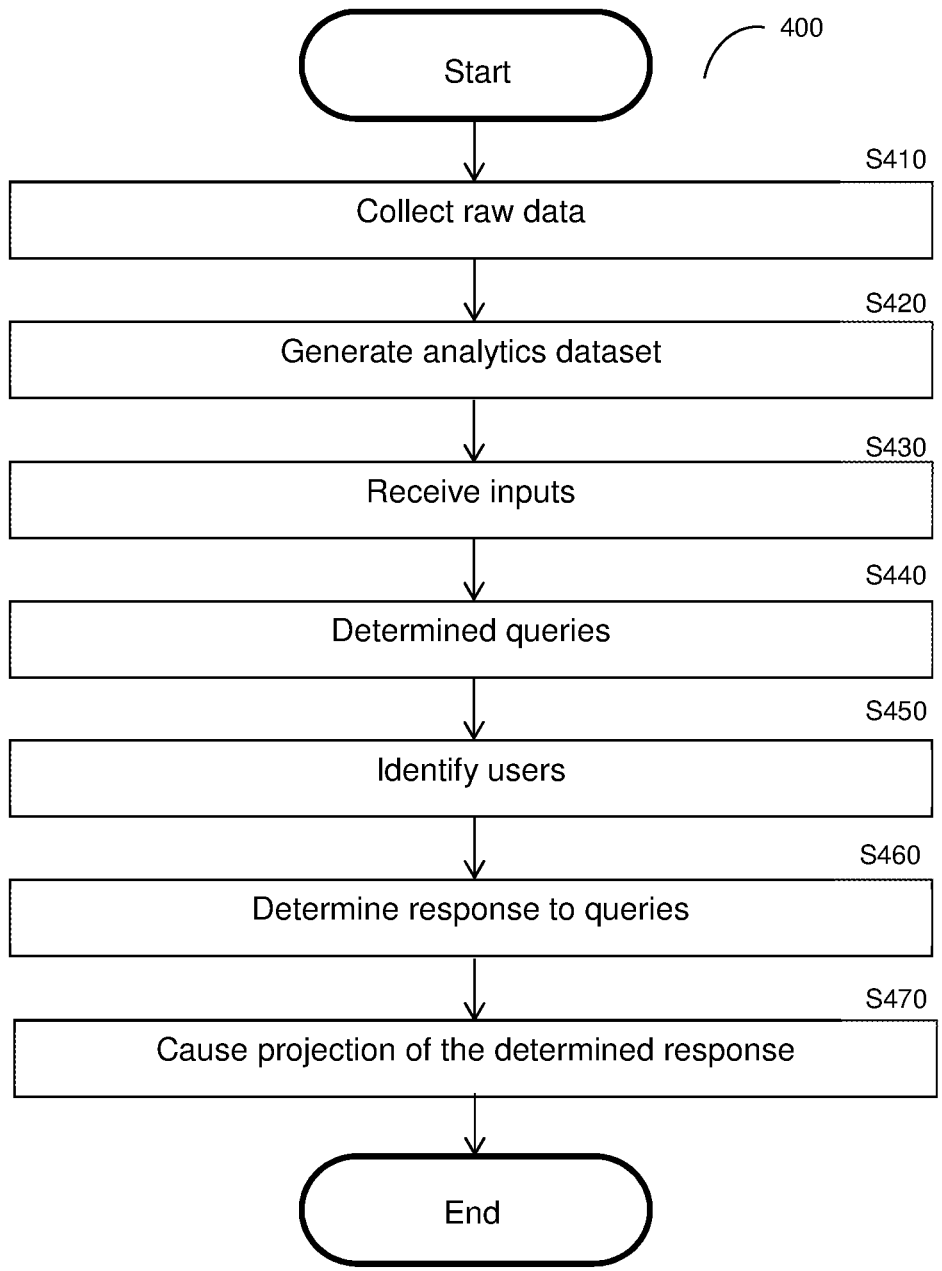
FIG. 4 is a flowchart illustrating a method for providing a sensory-based analytics response to a query in accordance with an embodiment.

FIG. 4 is an example flowchart 400 illustrating a method for providing a sensory response to a query according to an embodiment. In an embodiment, the method may be performed by a sensory analytics system (e.g., the sensory-based analytics system 200). The sensory-based analytics system may be communicatively connected to one or more user devices, interfaces, or both, for receiving and sending inputs and outputs.

At S410, raw data to be analyzed is collected from a plurality of data sources. In an embodiment, S410 may include extracting the data from the plurality of data sources, e.g., databases 210.

At S420, the collected raw data is analyzed to generate an analytics dataset. In an embodiment, generation of the analytics dataset may include performing a regression analysis on at least a portion of the collected raw data. The regression analysis may be performed using regression techniques that are familiar to one having ordinary skill in the art. A regression analysis is a statistical process for estimating the relationships among variables.

In an embodiment, S420 may include extracting, from the collected raw data, a subset of the collected raw data to be analyzed. The extracted subset of data may be determined based on the regression analysis. Analyzing only a subset of the collected raw data reduces computing resources used for analyzing the raw data, storing analytics, and the like.

The analytics dataset may include, but is not limited to, graphical user interfaces, reports, analytics (e.g., KPIs, KQIs, etc.), combinations thereof, and the like. The analytics may be further organized into one or more tables. In an embodiment, S420 may include performing a plurality of business intelligence operations on the collected raw data.

At optional S430, at least one sensory input is received or captured from at least one user device (e.g., the user device 320), from at least one sensory I/O interface, a combination thereof, and the like. The sensory input may be or may include, but is not limited to, sensory inputs, textual inputs, interactions with I/O interfaces (e.g., mouse, touch screen, keyboard, etc.), and the like. In some embodiments, the at least one input may be in a form of a query.

At S440, at least one query is determined based on the received at least one input. In a further embodiment, S440 may include parsing textual inputs. In a further embodiment, S440 may include performing speech-to-text or machine imaging to generate text based on audio or visual inputs, respectively. Alternatively or collectively, one or more predetermined queries may be determined at, e.g., predetermined time intervals. Regularly determining predetermined queries may allow for, e.g., providing regular updates regarding certain analytics.

At optional S450, for each query, a user may be identified based on at least a portion of the received at least one input corresponding to the query. As a non-limiting example, if three audio signal signatures are received as inputs, three users may be identified. The at least one user may be identified based on, e.g., matching between at least a portion of the received input and a plurality of predetermined signals of known users. In a further embodiment, if a portion of the received at least one input does not match any of the predetermined signals above a predetermined threshold, the user may be identified as unknown.

At S460, a response to the at least one query is determined based on the analytics dataset. In an embodiment, the response may be determined by querying the BI dataset, or the data generated from the plurality of databases, e.g., databases 210. In an embodiment, the response includes at least one sensory output for each query. To this end, in a further embodiment, S450 may further include selecting at least one sensory output. The selection may be based on at least one sensory output selection rule. The sensory output selection rules may be utilized to select a sensory output based on, e.g., a particular user, an analytic, a query, a type of each of the at least one input, a combination thereof, and the like. As a non-limiting example, if a query is received via a voice command input, the sensory output may be an audio output.

In yet a further embodiment, the response may include at least one sensory output for each identified user. In a further embodiment, the response may be based on an order of the users. The order may be based on, e.g., a predetermined priority of the users. The priority may be represented as, e.g., a numerical value (e.g., a priority of 10 may be the highest priority and a priority of 1 may be the lowest priority). In another embodiment, duplicate sensory outputs may be removed from the response. For example, if sensory outputs in the response would include two instances of audio output of the words "Sales are good: $300,000.00 this quarter," one instance of the audio output may be removed. In a further embodiment, users that are identified as unknown may be assigned the lowest priority. If users are assigned the same priority, the order of the users may be determined, e.g., randomly, based on an order of receipt of the corresponding inputs, and the like.

In another embodiment, the selection rules may be determined based on machine learning processing for a particular user. The machine learning processing may be based on previous sensory inputs detected after causing projection of at least one sensory output. As a non-limiting example, if no visual or audio inputs are received after projection of audio including the word "bad," it may be determined that the projection of audio for the user was ineffective. Accordingly, selection rules for the user may exclude audio outputs.

In yet another embodiment, the selection rules for a particular user may be based on metadata associated with the user. The metadata may indicate, but is not limited to, impairments or other reasons as to why particular types of sensory output will be ineffective for a user. For example, if metadata for the user indicates that the user is visually impaired, the selection rules may exclude visual output or may otherwise restrict visual output to only select types of visual output. In another embodiment, S460 may include detecting, based on the received at least one input, an impairment of each user who is impaired. For example, a user device, or terminal, equipped with an imaging device may detect (or may provide the input for detecting) the eye movements of the user. Based on the detected eye movements, it may be determined whether the eye movements of the user are consistent with eye movements of a user having a visual impairment.

At S470, projection of the at least one sensory output of the response is caused. Projecting the sensory outputs may include, but is not limited to, causing audio projection of an audio output, causing display of a visual output, causing illumination of a light-based output, causing haptic feedback, causing olfactory feedback, causing a change in environment, and the like. In an embodiment, S470 includes causing projection of each determined sensory output. In a further embodiment, S470 may include selecting an interface for projecting each output. As an example, the selected interface may be an interface from which an input of the same user was received.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for providing sensory analytics responses, comprising:
    collecting raw data from a plurality of data sources;
    extracting, from the collected raw data, a subset of the raw data to be analyzed;
    generating, based on the extracted subset of the raw data, an analytics dataset, wherein the analytics dataset includes a performance indicator;
    determining, based on at least one received input, at least one query;
    generating a plurality of user accounts, wherein each user account corresponds to a historical user and includes at least one sensory output selection rule for the user, wherein generating the plurality of user accounts further comprises determining, via machine learning, the at least one sensory output selection rule for each of the plurality of user accounts based on historical sensory outputs and historical sensory inputs received from the historical user corresponding to the user account in response to at least a portion of the historical sensory outputs;
    identifying, for each query, a user account providing the query from among the generated plurality of user accounts;
    determining, based on the analytics dataset and the plurality of user accounts, a response to the at least one query, wherein the response includes at least one sensory output, wherein the response is determined further based on the identified at least one user account, wherein determining the response further comprises selecting, based on the at least one sensory output selection rule of each of the identified at least one user account and the at least one query, the at least one sensory output, wherein each sensory output selection rule corresponds to at least one of the identified at least one user account, wherein each sensory output selection rule is determined based on metadata associated with a corresponding user account, wherein the metadata indicates at least one type of sensory output that is ineffective for a user of the corresponding user account, wherein the at least one type of sensory output that is ineffective for the user of the corresponding user account includes at least one type of sensory output that was determined to be ineffective based on the historical sensory inputs received from the user in response to the historical sensory outputs; and
    causing projection of the determined at least one sensory output.

2. The method of claim 1, wherein the analytics dataset is generated based on a subset of the collected raw data.

3. The method of claim 1, wherein determining the at least one query further comprises:
    parsing at least one textual input, wherein the at least one textual input is based on the at least one received input.

4. The method of claim 3, further comprising:
    determining, based on the at least one received input, the at least one textual input, wherein determining the at least one textual input includes at least one of: speech-to-text processing, and machine imaging.

5. The method of claim 1, wherein a first user account corresponds to a first priority level, wherein a second user account corresponds to a second priority level, wherein the second priority level is lower than the first priority level, further comprising:
    determining a response priority based on the priority level of the respective user account; and
    providing the response based on the response priority such that a first portion of the response of the first priority is provided before a second portion of the response of the second priority.

6. The method of claim 1, wherein the at least one query is determined further based on the performance indicator.

7. The method of claim 1, wherein the metadata indicates at least one impairment of the user, wherein the at least one type of sensory output that is ineffective for the user of the corresponding user account includes at least one type of sensory output that that is ineffective for users having the at least one impairment.

8. A non-transitory computer readable medium having stored thereon instructions for causing one or more processing units to execute a method, the method comprising:
    collecting raw data from a plurality of data sources;
    extracting, from the collected raw data, a subset of the raw data to be analyzed;
    generating, based on the extracted subset of the raw data, an analytics dataset, wherein the analytics dataset includes a performance indicator
    determining, based on a received at least one input, at least one query;
    generating a plurality of user accounts, wherein each user account corresponds to a historical user and includes at least one sensory output selection rule for the user, wherein generating the plurality of user accounts further comprises determining the at least one sensory output selection rule for each of the plurality of user accounts based on historical sensory outputs and historical sensory inputs received from the historical user corresponding to the user account in response to at least a portion of the historical sensory outputs;
    identifying, for each query, a user account providing the query from among the generated plurality of user accounts;
    determining, based on the analytics dataset and the plurality of user accounts, a response to the at least one query, wherein the response includes at least one sensory output, wherein the response is determined further based on the identified at least one user account, wherein determining the response further comprises selecting, based on the at least one sensory output selection rule of each of the identified at least one user account and the at least one query, the at least one sensory output, wherein each sensory output selection rule corresponds to at least one of the identified at least one user account, wherein each sensory output selection rule is determined based on metadata associated with a corresponding user account, wherein the metadata indicates at least one type of sensory output that is ineffective for a user of the corresponding user account, wherein the at least one type of sensory output that is ineffective for the user of the corresponding user account includes at least one type of sensory output that was determined to be ineffective based on the historical sensory inputs received from the user in response to the historical sensory outputs; and causing projection of the determined at least one sensory output.

9. A system for providing sensory analytics responses, comprising:
 a processing circuitry; and
 a memory, the memory containing instructions that, when executed by the processing circuitry, configure the system to:
 collect raw data from a plurality of data sources;
 extract, from the collected raw data, a subset of the raw data to been analyzed;
 generate, based on the extracted subset of the raw data, an analytics dataset, wherein the analytics dataset includes a performance indicator;
 determine, based on at least one received input, at least one query;
 generate a plurality of user accounts, wherein each user account corresponds to a historical user and includes at least one sensory output selection rule for the user, wherein the system is further configured to generate the plurality of user accounts by determining, via machine learning, the at least one sensory output selection rule for each of the plurality of user accounts based on historical sensory outputs and historical sensory inputs received from the historical user corresponding to the user account in response to at least a portion of the historical sensory outputs;
 identify, for each query, a user account providing the query from among the generated plurality of user accounts;
 determine, based on the analytics dataset and the plurality of user accounts, a response to the at least one query, wherein the response includes at least one sensory output, wherein the response is determined further based on the identified at least one user account, wherein determining the response further comprises selecting, based on the at least one sensory output selection rule of each of the identified at least one user account and the at least one query, the at least one sensory output, wherein each sensory output selection rule corresponds to at least one of the identified at least one user account, wherein each sensory output selection rule is determined based on metadata associated with a corresponding user account, wherein the metadata indicates at least one type of sensory output that is ineffective for a user of the corresponding user account, wherein the at least one type of sensory output that is ineffective for the user of the corresponding user account includes at least one type of sensory output that was determined to be ineffective based on the historical sensory inputs received from the user in response to the historical sensory outputs; and
 cause projection of the determined at least one sensory output.

10. The system of claim 9, wherein the analytics dataset is generated based on a subset of the collected raw data.

11. The system of claim 9, wherein the system is further configured to:
 parse at least one textual input, wherein the at least one textual input is based on the at least one received input.

12. The system of claim 11, wherein the system is further configured to:
 determine, based on the at least one received input, the at least one textual input, wherein determining the at least one textual input includes at least one of: speech-to-text processing, and machine imaging.

13. The system of claim 9, wherein the system is further configured to:
 determine a response priority based on the priority level of the respective user account; and
 provide the response based on the response priority such that a first portion of the response of the first priority is provided before a second portion of the response of the second priority.

* * * * *